United States Patent [19]

Schleiermacher

[11] 4,217,870
[45] Aug. 19, 1980

[54] VENTING VALVE FOR CRANKCASES OF RECIPROCABLE PISTON INTERNAL COMBUSTION ENGINES

[75] Inventor: Herbert Schleiermacher, Brühl, Fed. Rep. of Germany

[73] Assignee: Klöckner-Humboldt-Deutz Aktiengesellschaft, Cologne, Fed. Rep. of Germany

[21] Appl. No.: 964,907

[22] Filed: Nov. 30, 1978

[30] Foreign Application Priority Data

Nov. 30, 1977 [DE] Fed. Rep. of Germany ....... 2753335

[51] Int. Cl.² ...................... F02M 25/06; F01M 13/00
[52] U.S. Cl. ................................... 123/572; 123/41.86
[58] Field of Search .......................... 123/41.86, 119 B

[56] References Cited

U.S. PATENT DOCUMENTS

| | | | |
|---|---|---|---|
| 2,775,960 | 1/1957 | Druzynski | 123/119 B |
| 3,056,420 | 10/1962 | Dietrich | 123/119 B |
| 3,108,581 | 10/1963 | Humphreys | 123/119 B |
| 3,312,207 | 4/1967 | Martin et al. | 123/119 B |
| 3,380,441 | 4/1968 | Lewis | 123/119 B |
| 3,469,565 | 9/1969 | Weber et al. | 123/119 B |
| 3,754,538 | 8/1973 | Ephraim, Jr. et al. | 123/119 B |

*Primary Examiner*—P. S. Lall
*Attorney, Agent, or Firm*—Becker & Becker, Inc.

[57] ABSTRACT

A venting valve for a crankcase of a reciprocable piston internal combustion engine with a valve housing which is divided into three chambers by way of a movable wall and a hollow cylindrical valve member which is sealingly connected to the movable wall. The first one of these three chambers is arranged for communication with the surrounding or environment whereas the second chamber has a connection for communication with the crankcase, and the third chamber, which includes the inner chamber of the valve member, has a connection for communication with a suction conduit. The valve member in combination with its valve seat controls an opening between the second and third chambers. The connection for communication with the suction conduit forms the inner valve housing-connected support for the movable wall and is axially aligned with the valve member, and the connection for communication with the crankcase is located opposite the connection to the suction conduit and coaxially surrounds the valve member.

4 Claims, 2 Drawing Figures

VENTING VALVE FOR CRANKCASES OF RECIPROCABLE PISTON INTERNAL COMBUSTION ENGINES

The present invention relates to a venting valve for a crankcase for reciprocable piston internal combustion engines, and more specifically refers to a venting valve of the above mentioned type which by means of a movable wall sealingly connected to the circumference, and by means of a hollow cylindrical valve member sealingly connected to said wall is divided into three chambers. The first one of said chambers communicates with the surroundings while the second chamber has a connecting section communicating with the crankcase, while the third chamber which comprises the inner chamber of the valve member includes a connecting section communicating with the intake pipe. The valve member by means of its valve seat controls an opening between said second and third chamber, while the movable wall within the valve seat is fixedly connected to the housing.

Venting valves of the above mentioned type for crankcases have been described in German Patent No. 15 26 575. This known venting valve has the advantage that the varying underpressure in the intake pipe does not act upon the movable wall but equalizes either in the system or acts upon parts which are fixedly connected to the housing. For purposes of control, only the differential pressure between the crankcase pressure and the surrounding pressure is employed which under certain circumstances may be increased by a spring force. This known venting valve for crankcases, however, has the drawback that the pressure fluctuations in the crankcase act upon the movable wall and bring about an unstable control behavior, particularly due to the fact that in that portion of the valve housing which is acted upon by the crankcase pressure, the pressure build-up and the pressure decrease between the open and closed condition of the valve changes quickly.

It is, therefore, an object of the present invention to provide a venting valve for a crankcase of the above described general type which permits a simple manufacture thereof while considerably reducing the overall size.

This object and other objects and advantages of the present invention will appear more clearly from the following specification in connection with the accompanying drawings in which.

The venting valve for the crankcase according to the present invention is characterized primarily in that the connecting section communicating with the intake pipe forms the inner housing connected support of the movable wall and is arranged coaxially with regard to the valve member, and is furthermore characterized in that the connecting section communicating with the crankcase is located opposite to the connection communicating with the intake pipe while coaxially surrounding said valve member.

In view of the design of the connecting section communicating with the intake pipe as inner housing connected support of the movable wall, it is possible to arrange the connecting section which communicates with the intake pipe, and the connecting section communicating with the crankcase coaxially with regard to the valve member so that the valve housing and the valve member consist of rotation symmetrical parts which are easy to produce, while the crankcase venting valve can harmonically be inserted into any connecting line from the crankcase to the intake pipe while only requiring little space. The overflow cross section from the crankcase to the intake system is located at a slight distance from the effective surface of the movable wall so that pressure fluctuations existing especially within the region of the overflow cross section of the valve member cannot cause a fluttering.

The periodic pressure fluctuations can furthermore be reduced in conformity with a further development of the invention by connecting the second chamber through a throttling section with the connecting section, and by arranging the valve seat in flow direction ahead of said throttling section. As a result thereof, ahead of the effective surface of the movable wall, a quieted-down pressure chamber is created in which the brief pressure fluctuations cannot any longer be effective.

According to a further development of the invention, it is suggested that the throttle section is formed by an annular gap between the valve housing and the valve member. The thus designed throttle section can easily be produced.

In view of the coaxial arrangement of the connecting section and the valve member, it is possible and expedient that according to a still further development of the invention, the inner and outer yieldable part of the movable wall comprises a bead while the inner yieldable part due to its own tension engages the outer diameter of the connecting section communicating with the inlet conduit, whereas the outer yieldable part is clamped in between a housing upper and lower section.

Figure 1:
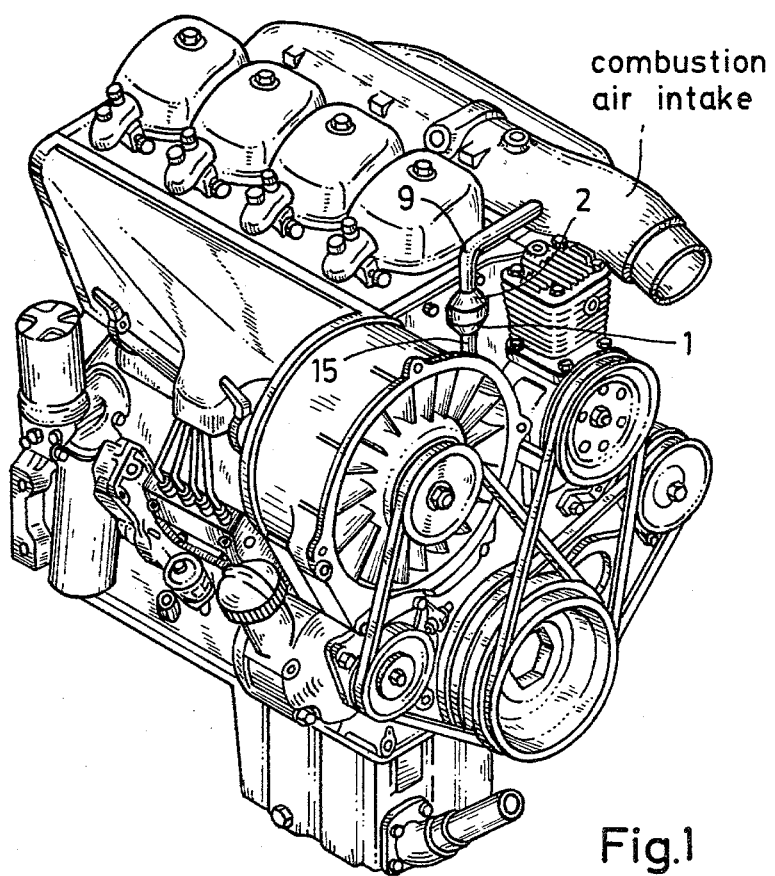
FIG. 1 is a perspective illustration of an internal combustion engine showing by way of example the location of a venting valve according to the present invention.
Figure 2:
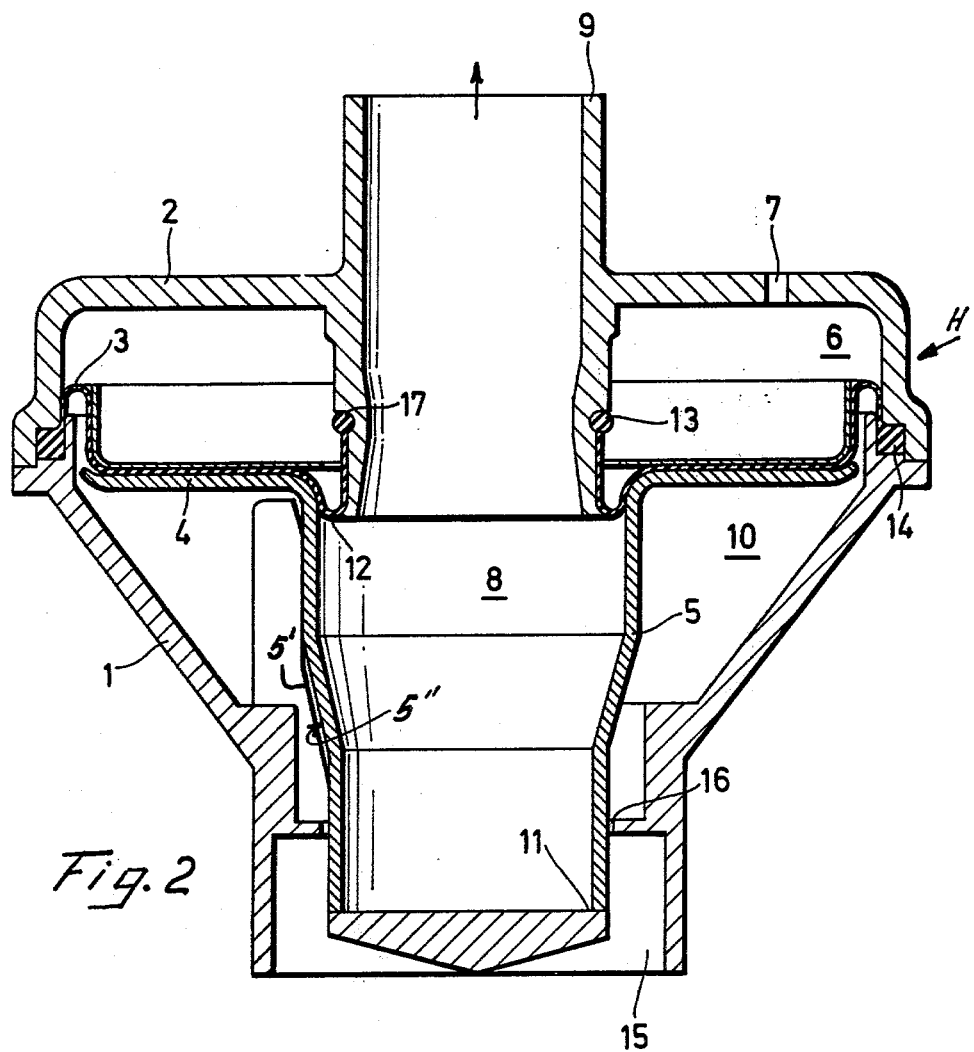
FIG. 2 illustrates on a somewhat larger scale than that of FIG. 1 a section through the venting valve according to the invention.

Referring now to the drawings in detail, the valve housing H comprises a lower section 1 and an upper section 2. The valve housing is divided into three chambers by means of a movable wall 4 and by a valve member 5 which forms one piece with said wall 4. The wall 4 is connected to the housing 1 in a sealing manner by means of a wall diaphragm 3, and more specifically at the circumference of said diaphragm 3. The first chamber 6 is through a bore 7 in communication with the surrounding, whereas the third chamber 8 which includes the inner chamber of the valve member 5 comprises a connecting section 9 leading to a non-illustrated intake pipe. If the engine involved is a carburetor equipped engine, the connecting section 9 communicates with a carburetor. If, however, the venting valve according to the invention for the crankcase is to be employed in connection with a Diesel engine, the connecting section 9 communicates with an air collector which in turn communicates with the air inlet of the engine. The second chamber 10 surrounds the valve member 5 which by means of its valve seat 11 controls an opening between the third chamber 8 and the second chamber 10. In order to make sure that the valve member 5 will always move straight and will close in a proper way, the valve member 5 is guided by circumferentially outwardly arranged ribs and cooperating grooves 5' and 5" respectively (one rib and one groove only being shown in FIG. 2). The movable wall 4 has its inner circumference connected to the intake section 9 by means of a roll diaphragm 12. To this end, the movable wall by means of a bead 13 due to its own tension in a groove 17 rests against the outer circumference of the connecting section 9. The roll diaphragm 3 likewise comprises a bead 14 which is clamped between the housing lower section 1 and the housing upper section 2.

The chamber 10 has a connecting section 15 which leads to a non-illustrated crankcase and is connected thereto through a throttle gap 16. When viewing in flow direction, the throttle gap 16 is located past the valve seat 11 so that the chamber 10 is not passed through by the crankcase gases within the region of the movable wall 4. Pressure fluctuations which may occur in the connecting section 15 and within the region of the valve seat 11 are by the throttle gap reduced to such an extent that they cannot bring about an unstable control behavior of the crankcase venting valve.

The venting valve according to the invention operates in the following manner: when the pressure building up in the crankcase has reached a magnitude exceeding the atmospheric pressure which latter through the bore 7 acts upon the topside of diaphragm 3, the crankcase pressure acting through throttle gap 16 upon the horizontal wall section 4 lifts the latter together with the diaphragm 3 so that valve member 5 is lifted off its seat 11. As a result thereof, the gases in the crankcase can then flow through the chamber 8 and the connecting section 9, and from there into the carburetor or a gas collector depending on whether the invention is a gasoline engine or a Diesel engine.

It is, of course, to be understood that the present invention is, by no means, limited to the specific showing in the drawings, but also comprises any modifications within the scope of the appended claims.

What I claim is:

1. A venting valve for a crankcase of a reciprocable piston internal combustion engine, which includes: a valve housing having a tubular connection fixedly connected thereto for communication with a suction line, a dividing structure comprising an annular movable wall section extending transverse to said housing and having an outer peripheral portion fixedly and sealingly connected to said housing and having an inner peripheral portion, sealingly engaged and supported by said tubular connection, said dividing structure dividing said housing into an upper and a lower housing section, a hollow cylindrical valve member sealingly connected to said movable wall section and substantially axially aligned with said tubular connection while the interior of said valve member communicates with the interior of said tubular connection, said annular transverse wall section dividing said housing into three chambers, the first one of said chambers being arranged for communication with the outside of said housing, the second one of said chambers surrounding said valve member and having associated therewith a tubular support section for communication with a crankcase to be vented, and a third chamber formed by the interior of said valve member, said valve member being operable to control communication between said second and third chambers, said tubular support section being arranged coaxially of said valve member, said tubular connection and said tubular support section being located opposite each other and said tubular connection also forming support engaging said dividing structure including the movable wall section.

2. A venting valve according to claim 1, which includes throttle means interposed between said second chamber and said tubular support section for establishing throttled communication therebetween.

3. A venting valve according to claim 2, in which said throttle means is formed by an annular gap between said housing and said valve member.

4. A venting valve according to claim 1, in which said movable wall includes an inner and an outer yieldable section each housing a bead, and in which the bead of said inner yieldable section rests by its own tension against the outer circumference of said tubular connection, whereas the bead pertaining to the outer yieldable section is clamped between said upper and lower housing section.

* * * * *